(12) United States Patent
Agarwal et al.

(10) Patent No.: US 10,712,912 B2
(45) Date of Patent: Jul. 14, 2020

(54) GENERATING CONTEXTUAL CUES LINKING RELATED BROWSER TABS

(71) Applicant: AirWatch LLC, Atlanta, GA (US)

(72) Inventors: Avinash Agarwal, Bangalore (IN); Sivasubramaniam Sivakumar, Bangalore (IN); Sharun Samuel, Bangalore (IN)

(73) Assignee: VMWare, Inc., Palo Alto, CA (US)

( * ) Notice: Subject to any disclaimer, the term of this patent is extended or adjusted under 35 U.S.C. 154(b) by 25 days.

(21) Appl. No.: 15/458,414

(22) Filed: Mar. 14, 2017

(65) Prior Publication Data

US 2018/0267694 A1  Sep. 20, 2018

(51) Int. Cl.
*G06F 3/00* (2006.01)
*G06F 3/0483* (2013.01)
*G06F 3/048* (2013.01)
*G06F 3/0481* (2013.01)

(52) U.S. Cl.
CPC ............ *G06F 3/0483* (2013.01); *G06F 3/048* (2013.01); *G06F 3/0481* (2013.01)

(58) Field of Classification Search
CPC ....... G06F 3/048; G06F 3/0481; G06F 3/0483
See application file for complete search history.

(56) References Cited

U.S. PATENT DOCUMENTS

| 5,920,313 | A  | * | 7/1999  | Diedrichsen | G06F 3/0481 |
|  |  |  |  |  | 715/767 |
| 5,977,974 | A  | * | 11/1999 | Hatori | G06F 3/0481 |
|  |  |  |  |  | 715/839 |
| 6,222,541 | B1 | * | 4/2001  | Bates | G06F 3/0481 |
|  |  |  |  |  | 715/786 |
| 6,353,451 | B1 | * | 3/2002  | Teibel | G06F 3/0481 |
|  |  |  |  |  | 715/764 |
| 6,750,864 | B1 | * | 6/2004  | Anwar | G06F 17/30489 |
|  |  |  |  |  | 345/440 |
| 7,293,238 | B1 | * | 11/2007 | Brook | G06F 21/552 |
|  |  |  |  |  | 709/224 |
| 7,565,621 | B2 | * | 7/2009  | Molander | G06F 9/451 |
|  |  |  |  |  | 715/805 |
| 8,775,965 | B1 | * | 7/2014  | Kuscher | G06F 3/0481 |
|  |  |  |  |  | 715/777 |
| 8,930,810 | B2 | * | 1/2015  | Artigue | G06F 9/451 |
|  |  |  |  |  | 715/243 |
| 9,213,714 | B1 | * | 12/2015 | Ording | G06F 17/30126 |
| 2005/0120292 | A1 | * | 6/2005  | Suzuki | G06F 16/958 |
|  |  |  |  |  | 715/206 |
| 2008/0005686 | A1 | * | 1/2008  | Singh | G06F 3/0483 |
|  |  |  |  |  | 715/764 |

(Continued)

*Primary Examiner* — Kieu D Vu
*Assistant Examiner* — Andrew Chung
(74) *Attorney, Agent, or Firm* — Thomas|Horstemeyer, LLP (57) ABSTRACT

Disclosed are various approaches for providing contextual or cognitive cues that link browser tabs together within a browser application. Browser tabs that are determined to be related to one another can be colored with a similar color. A similar color can be one in which a color property is modified so that the colors appear similar to a user. Relationships between browser tabs can be determined based upon whether a browser tab was created in response to following a link within a parent browser tab.

12 Claims, 9 Drawing Sheets

(7 of 9 Drawing Sheet(s) Filed in Color)

(56) References Cited

U.S. PATENT DOCUMENTS

| | | | | |
|---|---|---|---|---|
| 2008/0177994 | A1* | 7/2008 | Mayer | G06F 9/4418 713/2 |
| 2009/0063971 | A1* | 3/2009 | White | G06F 3/04817 715/716 |
| 2009/0204902 | A1* | 8/2009 | Morris | G06F 16/00 715/751 |
| 2009/0327947 | A1* | 12/2009 | Schreiner | G06F 3/0483 715/777 |
| 2011/0066982 | A1* | 3/2011 | Paulsami | G06F 3/0482 715/835 |
| 2011/0314407 | A1* | 12/2011 | Cruz Moreno | G06F 16/957 715/777 |
| 2013/0019171 | A1* | 1/2013 | Mounty | G06F 11/3688 715/704 |
| 2013/0159922 | A1* | 6/2013 | Borkowski | G06F 3/0485 715/786 |
| 2014/0059430 | A1* | 2/2014 | White | G06F 17/30017 715/716 |
| 2015/0007105 | A1* | 1/2015 | Li | G09G 5/14 715/804 |
| 2015/0346929 | A1* | 12/2015 | Karunamuni | G06F 3/0483 715/777 |
| 2016/0154554 | A1* | 6/2016 | Fang | G06F 3/0481 715/777 |
| 2016/0232137 | A1* | 8/2016 | Liu | G06F 17/2235 |
| 2016/0357363 | A1* | 12/2016 | Decker | G06F 3/165 |
| 2018/0018795 | A1* | 1/2018 | Li | G06F 3/0483 |
| 2018/0246624 | A1* | 8/2018 | Barrus | G06F 3/0482 |

\* cited by examiner

GENERATING CONTEXTUAL CUES LINKING RELATED BROWSER TABS

BACKGROUND

In modern computing environments, the browser is becoming one of the most-used applications on the desktop. The browser can be used for email, research, data entry, coding, and a multitude of other uses. Modern browsers typically provide the ability for users to generate multiple browser windows or browser tabs, each of which can render a separate content page. Users are increasingly creating browser tabs to render different web pages for various reasons, whether it is to preserve the contents of a first browser tab while content is retrieved and rendered in another browser tab. In some cases, a user might enable a browser setting that causes a new browser tab to be generated whenever any hyperlink is followed or when a particular option is selected when opening a particular hyperlink.

As users open more and more tabs in a particular browser session, the appearance of the browser can become cluttered and disorganized. Additionally, there is generally no sense of context linking browser tabs. As the number of browser tabs increases, the user may forget which browser tabs were opened from hyperlinks from another browser tab and which tabs were newly created browser tabs in a new context.

Accordingly, solutions for maintaining a sense of context among browser tabs can improve user efficiency and organization in a desktop environment.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The patent or application file contains at least one drawing executed in color. Copies of this patent or patent application publication with color drawing(s) will be provided by the Office upon request and payment of the necessary fee.

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples of a framework that facilitates organization of browser tabs or browser windows to provide visual contextual cues between related tabs or windows. Throughout this application, the examples herein are discussed in the context of browser tabs. However, examples of the disclosure can also be applied to various browser windows that are created within a browser application.

As noted above, a web browser, or a browser application, can be the application on a user's device that receives the most or at least a considerable amount of usage. Users can often access email or perform work or other personal tasks within a browser. Additionally, users might consume content, such as audio or video content, within a browser tab. Users might also create and leave multiple browser tabs open as they go about their day. For example, when a user starts up his or her computer or mobile device, the browser might be one of the first applications they launch to check personal or corporate email, browse daily news, or perform other tasks. As the user's browsing session evolves or progresses, the user might utilize the browser for other tasks.

For example, the user might perform research for their job in a search engine, shop for items at an e-commerce site, check their financial information with their bank's website, or perform a multitude of personal or work tasks within the browser. Through normal daily use of the browser, the number of open tabs can grow to the point that the user might lose a sense of context between browser tabs or forget which browser tabs were newly opened or were opened by following a hyperlink from within another browser tab. Accordingly, the user's browsing session can become disorganized or considerably visually cluttered over time.

As the number of open browser tabs grows, the user might have no way to relate browser tabs with one another or retain a sense of context between browser tabs. As a result, the user might leave browser tabs open that they might otherwise be able to close because they fail to remember why or from where they were even opened in the first place. Accordingly, examples of the disclosure can create contextual or cognitive cues that link browser tabs with one another.

In one example, related browser tabs are assigned a similar color, and unrelated browser tabs are assigned dissimilar colors. Relationships between browser tabs can be determined based upon whether a particular browser tab is newly created or whether a browser tab is created as a result of following a hyperlink from another browser tab. If a browser tab is created by following a hyperlink from another tab, the newly created browser tab can be thought of as a child tab of the other tab. The browser tab from which the hyperlink was followed by the user can be thought of as the parent tab of the child tab. If a browser tab is newly created within the browser, it can be thought of as unrelated to other browser tabs other than its child tabs.

Figure 1A:
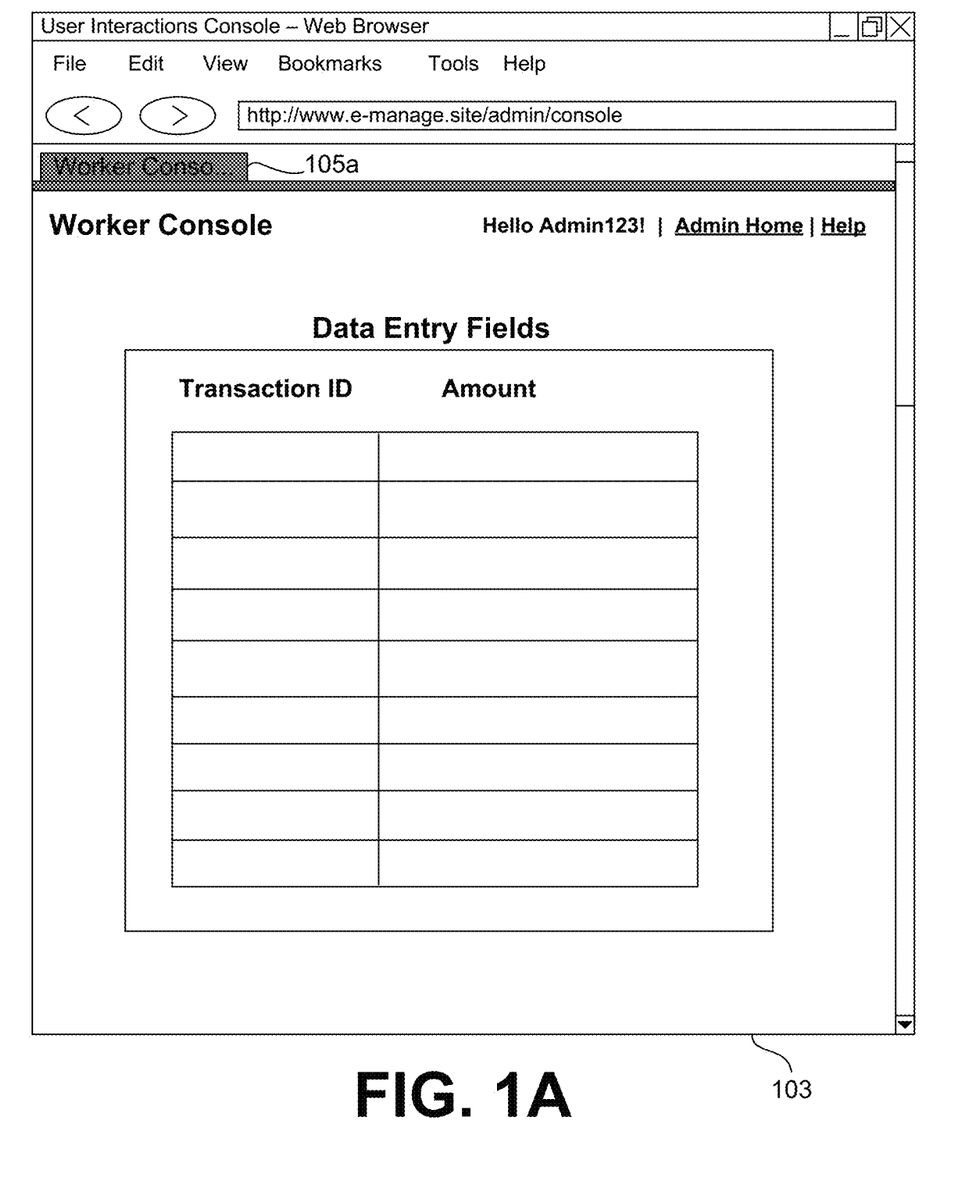
FIG. 1A is an example browser user interface according to various examples of the disclosure.

To demonstrate an example according to the disclosure, reference is made to FIG. 1A, which illustrates a browser 103 that can be executed by a computing device and rendered on a display associated with the computing device. In the depicted browser 103, a first browser tab 105a has been generated. The browser tab 105a can be generated upon launching the browser 103 or in response to a request by the user to create the browser tab 105a. In either scenario, the browser 103, or a plugin or extension that provides functionality as described herein, can determine whether the browser tab 105a is related to another browser tab 105a. The relationship can be determined by detecting whether the request to create the browser tab 105a originated from a hyperlink followed from another browser tab or whether the browser tab 105a is a newly created tab. For example, a newly created tab can be generated upon launch of the browser 103 or in response to a user selecting an option within the browser 103 to create a new tab in the browser.

Upon creating the browser tab 105a in the example of FIG. 1A, the browser 103 can assign a color to the browser tab 105a. Because the browser tab 105a is not related to another tab, the browser 103 can assign any color to the browser tab 105a. In some cases, the browser 103 can assign colors in a preconfigured order such that varying primary colors are assigned to unrelated browser tabs, followed by varying secondary colors, tertiary colors, and so on.

Additionally, the color assigned to the browser tab 105a can be applied to a portion of the browser tab 105a that is visible to the user when the user is viewing other open browser tabs. The portion of the browser tab 105a to which the color is applied can also include the portion that a user can select to cause the browser tab 105a to be foregrounded. In some examples, the color can also be applied to an additional portion of the page that is below the browser tab 105a, which can indicate to the user that the browser tab 105a is the tab that has been placed in the foreground.

Figure 1B:
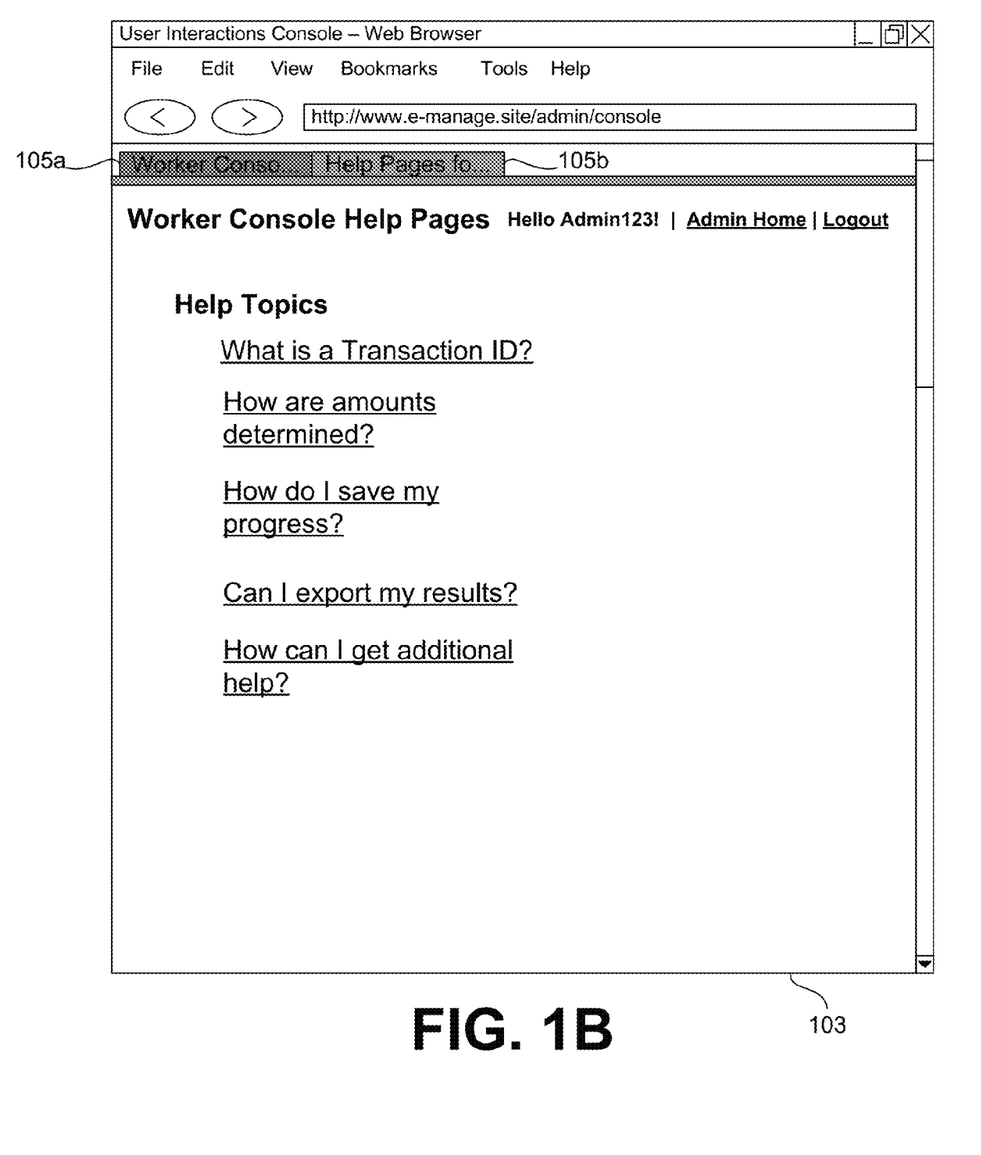
FIG. 1B is an example browser user interface according to various examples of the disclosure.

Continuing the example of FIG. 1A, reference is now made to FIG. 1B. In the scenario depicted in FIGS. 1A-1B, a user has followed a hyperlink shown within the content page rendered in the browser tab 105a, which causes browser tab 105b to be generated. In some examples, the browser 103 can be configured to create a new tab whenever the user follows any hyperlink. In other examples, the browser 103 can allow the user to cause a content page corresponding to a followed hyperlink to be rendered within a new browser tab 105b. For example, the browser 103 can generate the browser tab 105b when the user follows the hyperlink while holding a particular key on the keyboard or by selecting the hyperlink with an alternate mouse button or other input gesture.

Accordingly, in any scenario, when the browser 103 receives a request to generate a new browser tab 105b in response to the user following a hyperlink, the browser 103 can identify the parent tab of the browser tab 105b. In other words, the browser 103 can identify the browser tab 105a as the tab from which the hyperlink was followed. The browser 103 can then generate a color for the browser tab 105b by modifying one or more color properties of the color of the browser tab 105a. In other words, the browser 103 can generate a color for the child browser tab 105b that is similar to the color of the parent browser tab 105a. In one example, the color of the child browser tab 105b, or the child color, can be generated by identifying the color of the parent browser tab 105a and modifying one or more color properties by a predefined amount. In one example, the hue, tint, saturation, and/or lightness of the parent color can be modified. The one or more color properties can be modified by a predefined amount so that the child color is similar in appearance to the parent color but also appears as a different color to most users.

In another example, the child color can be generated or selected by modifying a color property by an amount that depends on the number of children of a particular parent browser tab 105a. For example, if the browser tab 105a spawns a child browser tab 105b, and then the child browser tab 105b spawns its own children browser tab 105, and then those children browser tabs spawn their own children, the color property or properties that are modified to generate child colors can be gradually modified as the quantity of parent-child tiers grows. For example, should a child browser tab of the depicted browser tab 105b be generated, the color of browser tab 105b can be modified to generate the color of the new child browser tab 105. However, should the user switch contexts back to browser tab 105a and cause a child of browser tab 105a to be generated, the browser 103 can assign the newly created browser tab 105 the same color as browser tab 105b.

In any scenario, by assigning related browser tabs 105 similar colors, a contextual or cognitive cue that links the browser tabs to one another is established. As more and more browser tabs are created, the varying colors that are assigned to the browser tabs 105 can help a user maintain a sense of order and organization between browser tabs 105 within a browser 103.

Figure 1C:
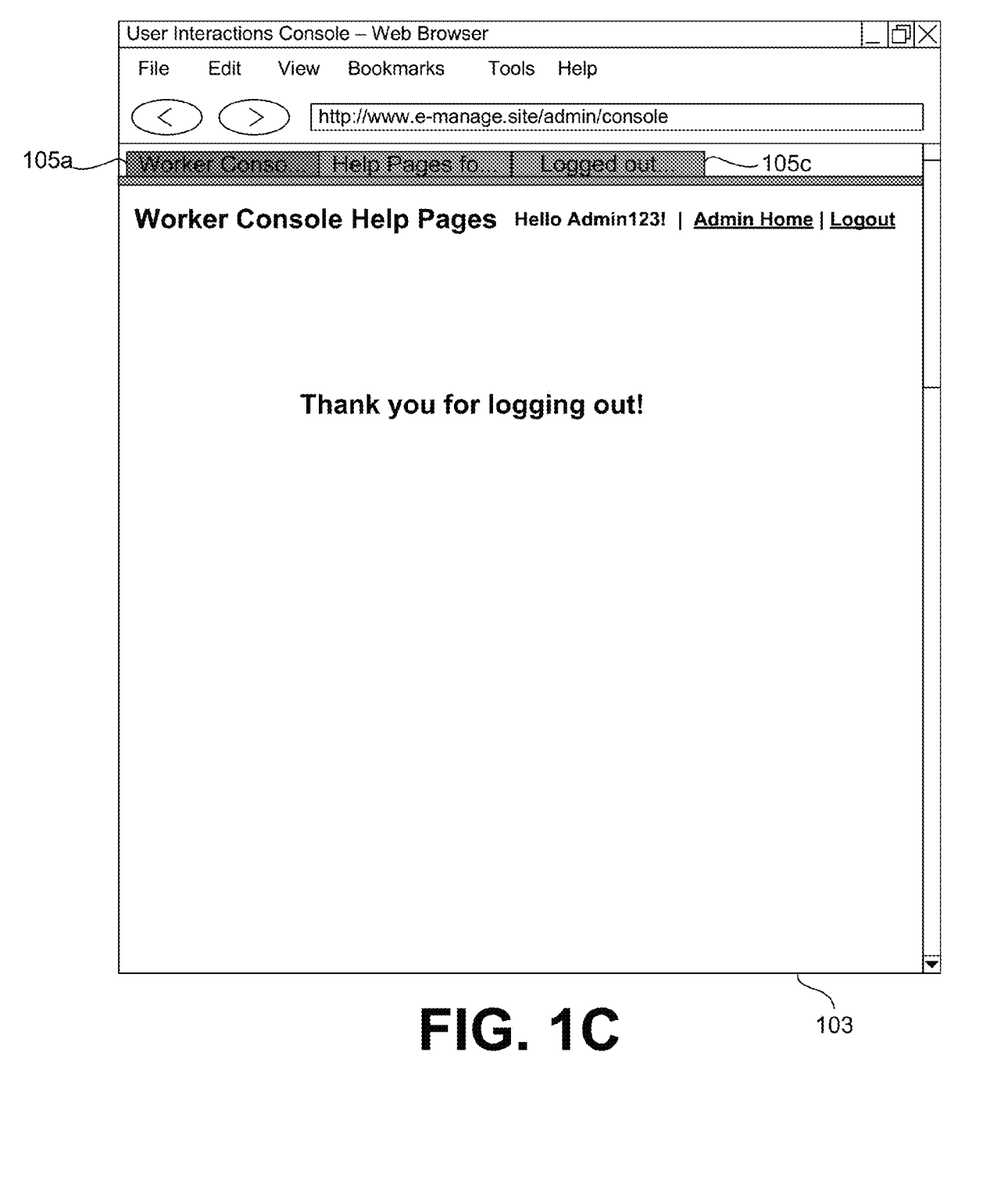
FIG. 1C is an example browser user interface according to various examples of the disclosure.

FIG. 1C illustrates an example of the user causing an additional child tab of browser tab 105a to be generated. In the depicted example, the user has switched browser contexts back to browser tab 105a and followed a hyperlink from within the browser tab 105a by enabling an option that causes hyperlinks to be rendered within a new browser tab. In response to the user following the hyperlink, the browser 103 can create a new browser tab 105c and assign it the same color as browser tab 105b (FIG. 1B) because browser tab 105b and 105c are both immediate children of browser tab 105a.

Figure 1D:
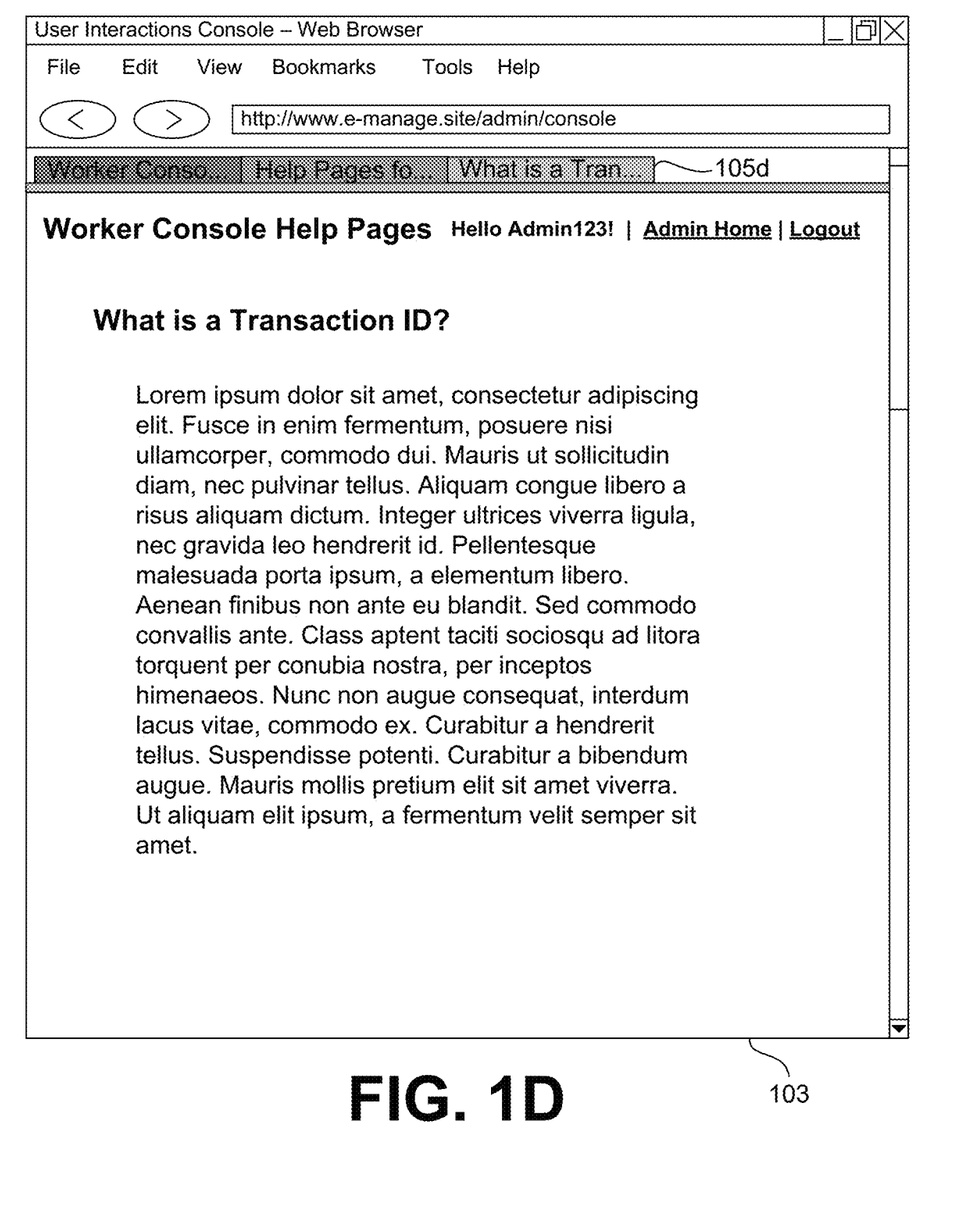
FIG. 1D is an example browser user interface according to various examples of the disclosure.

To illustrate a different scenario, reference is now made to FIG. 1D. In the example of FIG. 1D, the user has followed a hyperlink from browser tab 105b (FIG. 1B). Accordingly, the browser 103 can identify the browser tab 105b as the parent tab of browser tab 105d. In other words, the browser tab 105d is not an immediate child of browser tab 105a. Accordingly, the browser 103 can generate the color that is assigned to the browser tab 105d by modifying the color of browser tab 105b.

Figure 1E:
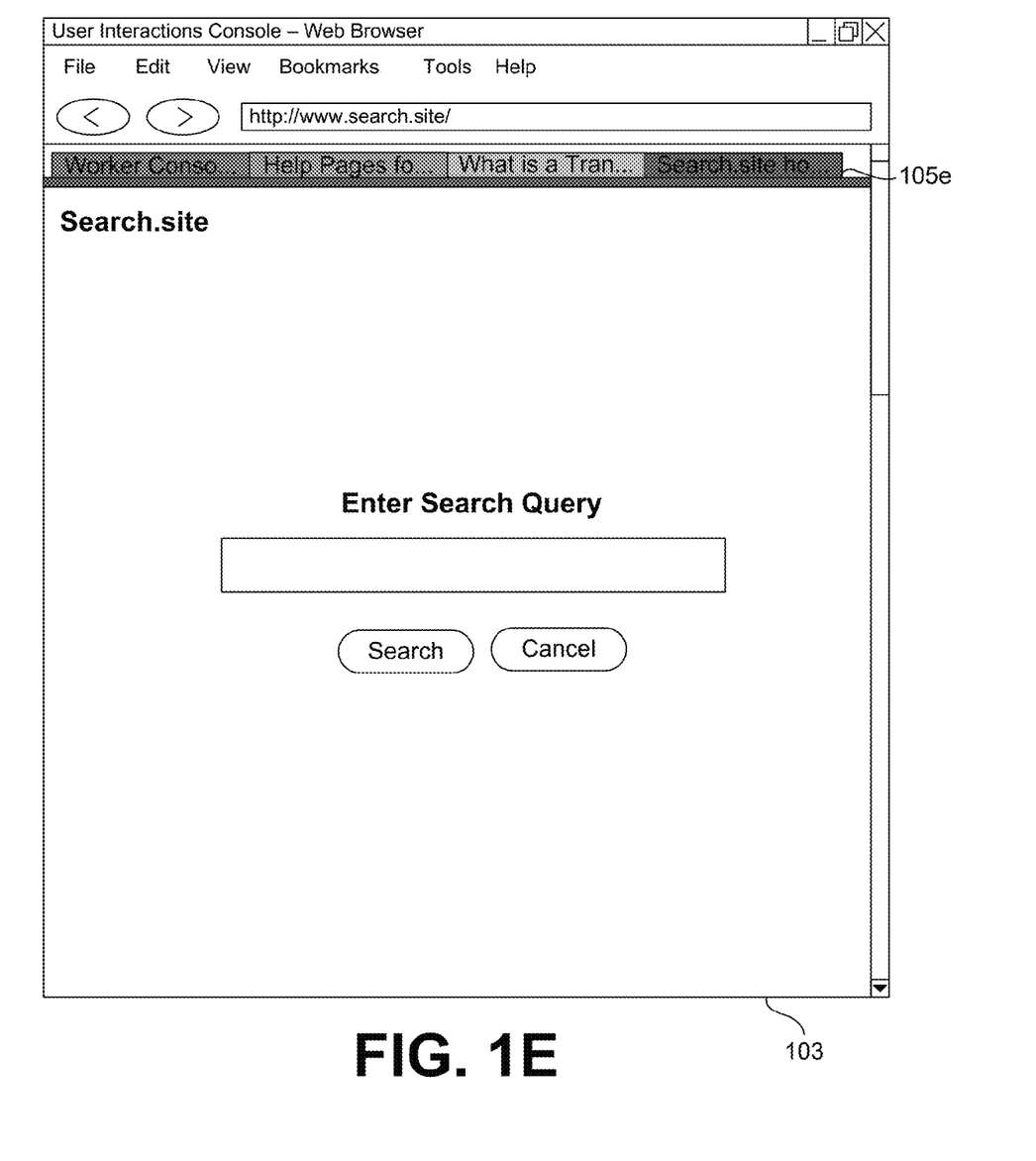
FIG. 1E is an example browser user interface according to various examples of the disclosure.

Referring now to FIG. 1E, shown is an example of a browser tab 105e that is unrelated to the other browser tabs 105 within the browser 103. In one example, the browser 103 can detect that the browser tab 105e is unrelated to the other browser tabs 105 within the browser 103 by determining whether the browser tab 105e is a newly created browser tab 105 rather than a browser tab 105 that is generated as a result of the user following a hyperlink from another browser tab 105.

If the browser tab 105e is a newly created browser tab 105, the browser 103 can assign a color to the browser tab 105e that varies from the other browser tabs 105a, 105b, 105d, that are unrelated to the browser tab 105e. The browser 103 can select the color of browser tab 105e by selecting a different primary color than the color of browser tab 105a, which is the browser tab 105a within the browser that does not have a parent. In another example, the browser 103 can select a different secondary or tertiary color relative to the color of browser tab 105a if there are no remaining primary colors from which to select.

In some examples, the browser 103 can employ color wheel theory and select a complementary color. In one example, the first color chosen can be preconfigured or a user selected color that is assigned to browser tab 105a. The color selected for browser tab 105e can be a complementary color that opposite the color of browser tab1 105a in a color wheel or color spectrum. According to one definition, complementary colors are colors that, when combined, cancel each other out or produce a grey-scale color. Accordingly, if the first color chosen for browser tab 105a is the primary color red, the color for the next unrelated browser tab 105 can be green. Similarly, if the orange and blue or yellow and purple are other examples of complementary colors that can be chosen for different unrelated browser tabs 105 that determined to be unrelated to one another.

Figure 1F:
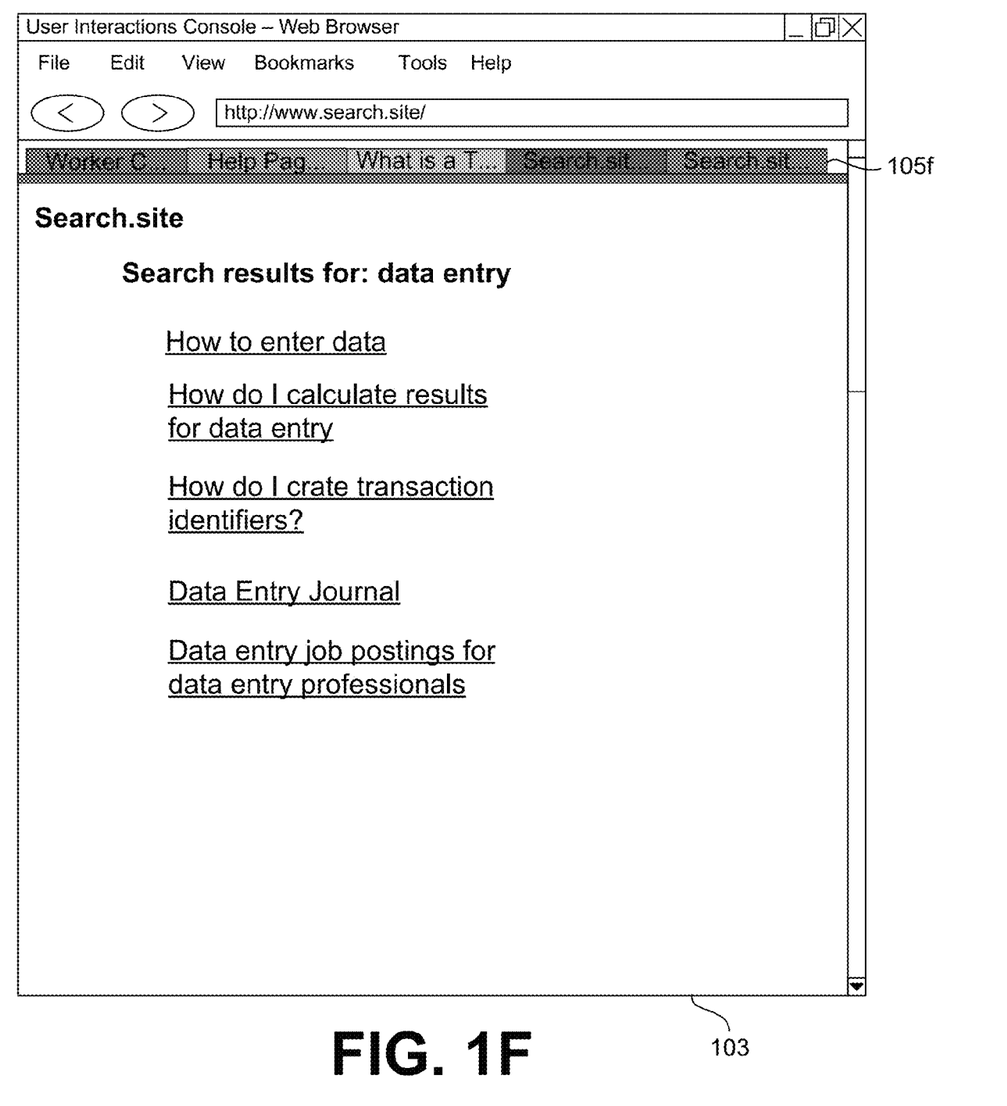
FIG. 1F is an example browser user interface according to various examples of the disclosure.

Continuing the example of FIG. 1E, reference is now made to FIG. 1F. In FIG. 1F, the browser 103 determines that browser tab 105*f* is related to browser tab 105*e*. The browser 103 can again make such a determination by determining that the request to create browser tab 105*f* is created when a user follows a hyperlink in browser tab 105*e* is an association with the request to create a new tab within the browser 105. Accordingly, the browser 103 can select and assign a color to the browser tab 105*f* that is similar in appearance to the parent of browser tab 105*f* by modifying one or more color properties of the color of browser tab 105*f*.

Figure 1G:
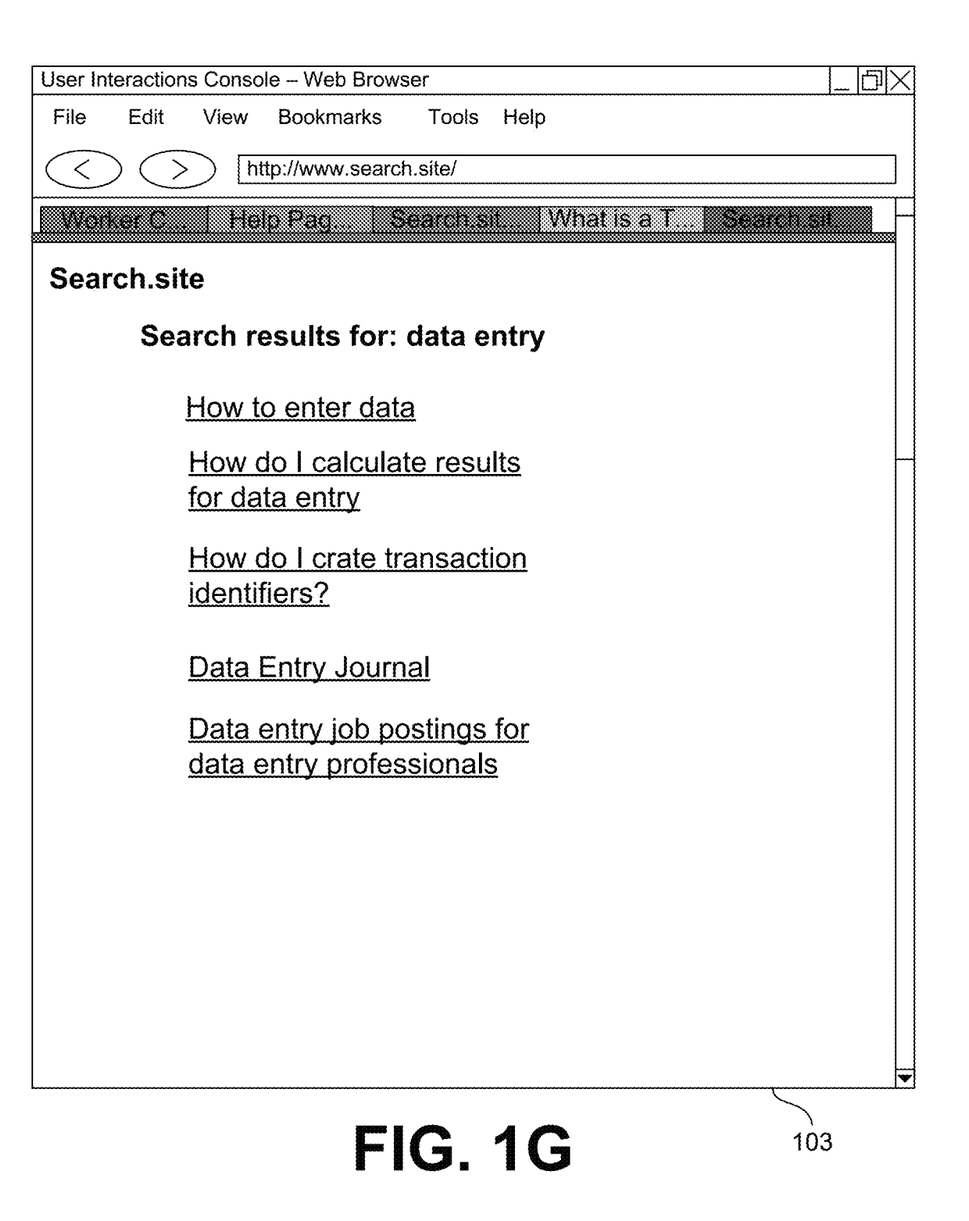
FIG. 1G is an example browser user interface according to various examples of the disclosure.

Continuing the example of FIG. 1F, reference is now made to FIG. 1G. As shown in FIG. 1G, the user has reorganized or rearranged the browser tabs 105. Because the browser tabs 105 have been colored based upon their relationship to other browser tabs 105, a contextual or cognitive cue that links browser tabs 105 within one another remains in the browser 105. Therefore, as the number of browser tabs 105 grows and as browser tabs are potentially rearranged, the user can visually determine the relatedness of browser tabs 105 with one another based upon color. Additionally, although color is discussed and disclosed as one use case, the same concepts can also be applied to browser tabs that are assigned a particular pattern or other visual tag. Additionally, it is not necessary in all examples to color the entire browser tab or the entire portion of a browser tab 105 that is visible when the tab is backgrounded. In some examples, a smaller portion of the browser tab 105 can be colored according to examples of this disclosure.

Figure 2:
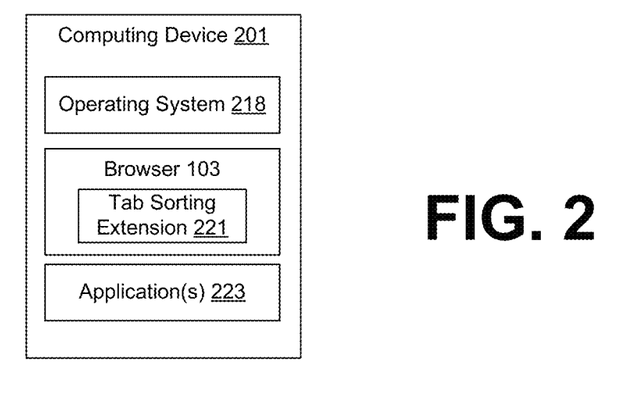
FIG. 2 is a drawing of a computing device according to various examples of the disclosure.

FIG. 2 illustrates an example of certain elements of a computing device 201 according to one example of the disclosure. The computing device 201 shown in FIG. 2 is one example of a device that can implement examples of the disclosure. The computing device 201 can include, for example, a processor-based computer system. According to various examples, a computing device 201 can be in the form of a desktop computer, a laptop computer, a personal digital assistant, a mobile phone, a smartphone, or a tablet computer system. The computing device 201 can be coupled to or have a display on which a user interface associated with the browser 103 and potentially other applications can be rendered. In one example, the display can include a color display so that the colors of the various browser tabs 105 can be shown.

A browser 103 can be installed on the computing device 201. The browser 103, when executed, can retrieve and render content pages, such as web pages. In some examples, the content pages can be retrieved over a network connection and/or include hyperlinks to other network pages. The browser 103 can also include a setting, which may or may not be user-configurable, that causes hyperlinks to other content pages to be retrieved and rendered in a separate browser tab 105 within the browser. The browser 103 can also include a user-configurable option that allows a new browser tab to be generated when a particular option is selected from within an on-screen menu, when a particular gesture is performed, a voice command provided, a keyboard button depressed, or any other user input provided that corresponds to a recognized input to open a hyperlink within a new browser tab 105.

The browser 103 can also include an option whereby a new browser tab 105 is created without a user following a hyperlink. In other words, an empty browser tab 105 or a browser tab 105 in which a home page or default page is rendered can be created by a user within the browser 103. These newly created browser tabs 105 can be considered unrelated to other browser tabs 105 other than subsequently related children of the newly created browser tab 105.

In some examples, the functionality discussed herein can be implemented within a browser plugin or extension. Accordingly, the tab sorting extension 221 is depicted. In one implementation, the tab sorting extension 221 can perform the coloring of browser tabs 105 based upon the relatedness of browser tabs to one another. In other implementations, the functionality of coloring the browser tabs 105 can be integrated into the browser 103 natively.

The computing device 201 can also execute an operating system 218 and/or other applications 223 that facilitate operation and/or management of the computing device 201. A discussion of the operating system 218 and these other applications 223 that can be executed by the computing device 201 are not necessary for an understanding of the examples of this disclosure.

Figure 3:
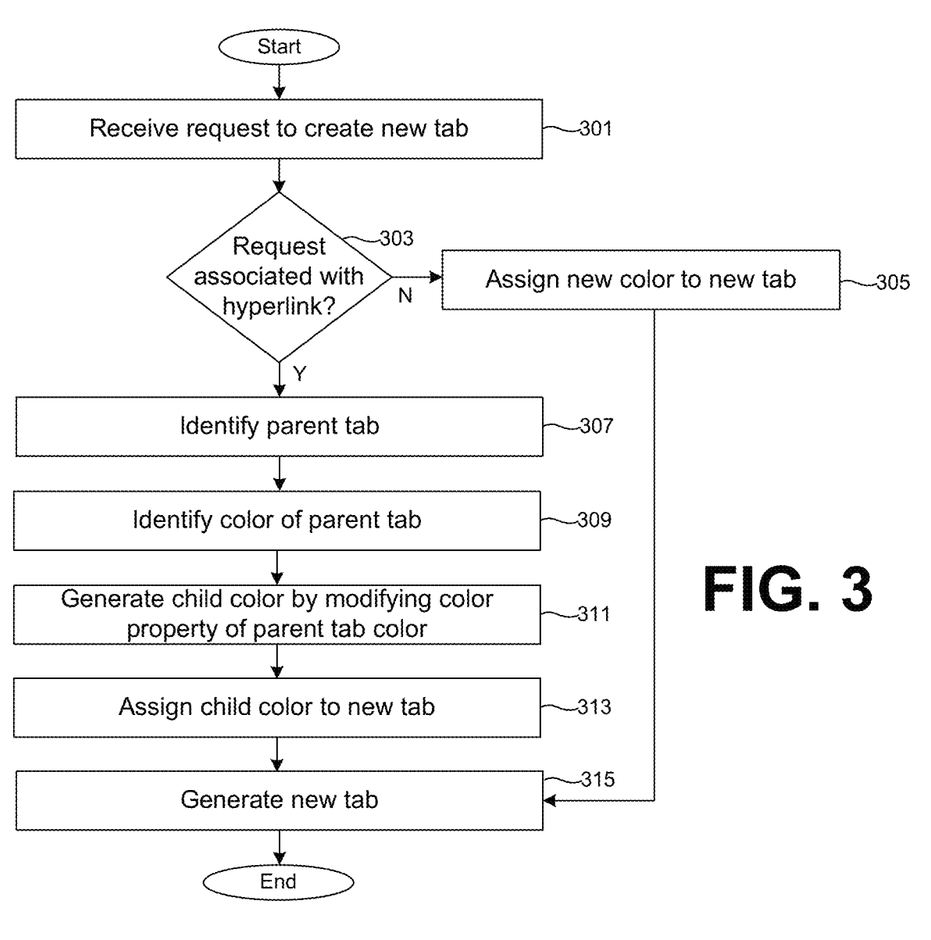
FIG. 3 is a flowchart that illustrates functionality according to a third example of the disclosure.

Referring next to FIG. 3, shown is a flowchart and illustrates functionality of the browser 103 according to an example of the disclosure. The functionality illustrated in FIG. 3 can also be provided by an extension, such as the tab sorting extension 221, according to certain implementations or examples. In other examples, the functionality illustrated in FIG. 3 can also be provided natively within the browser 103. Although the flowchart is discussed with respect to being performed within the browser 103, the functionality can also be implemented within the tab sorting extension 221.

First, at step 301, the browser 103 can receive a request to generate or create a new browser tab 105 within the browser 103. A new browser tab 105 can represent a new browser window or a portion of a window in which a content page can be rendered. The request can be generated by a request to create a new tab that is associated with a hyperlink followed by a user or by a request to create a new or empty browser tab 105 that is unrelated to other browser tabs 105.

At step 303, the browser 103 can determine whether the request to create a new browser tab 105 is associated with a hyperlink followed by a user in another browser tab 105, which can determine relatedness between tabs. If the request to generate a new browser tab 105 is not associated with a hyperlink followed by a user in another browser tab 105, the browser can determine that the newly created browser tab 105 is unrelated to other browser tab 105 within the browser. Accordingly, the process would then proceed to step 305. If the request to generate a new browser tab 105 is caused by the user following a hyperlink in another browser tab 105, the browser can establish a parent-child relationship between the browser tab 105 containing the hyperlink and the browser tab 105 that will be newly created.

At step 305, the browser 103 can assign a new color to a newly created browser tab 105 that is unrelated to other browser tabs 105 within the browser 103. The browser 103 can select a new color by selecting a different primary, secondary, or tertiary color relative to other colors that are already assigned to other parent browser tabs 105 within the browser 103. The browser 103 can also select a new color by selecting a complementary color of the most recently assigned color that was assigned to another parent browser tab 105. If there are no other browser tabs 105 currently open within the browser 103, the browser 103 can assign a preconfigured initial color based upon a user-selected option, a browser theme, a browser skin, or by selecting a default color. In this case, the default color can be a primary color or a default color within the browser 103 or operating system.

From step 305, the process can proceed to step 315, where the browser 105 can generate a new browser tab 105 that is assigned the color identified at step 305. From step 315, the process can proceed to completion, as the browser has created a new browser tab 105 that is not related to another browser tab 105 and assigned the browser tab 105 a color that provides a contextual or cognitive cue of separation from the other browser tabs 105 that might be present within the browser 103.

If at step 303 the browser 103 determines that the browser tab 105 is related to another browser tab 105, the process can proceed to step 307. Again, the browser 105 can make this determination by determining whether the request to generate a new browser tab 105 results from a user following a hyperlink from another browser tab 105.

At step 307, the browser 103 can identify the parent browser tab 105 associated with the request to generate a new browser tab 105. The browser 103 can identify the parent browser tab 105 by determining which of the browser tabs 105 within a particular browser session caused the request to generate the new browser tab 105. The process can then move to step 309.

At step 309, the browser 103 can identify a color of the parent browser tab 105 with which the request to create a new browser tab 105 is related. In other words, the browser 103 can identify the color of the related browser tab 105 to the newly created browser tab 105.

At step 311, the browser 103 can generate a color for the new browser tab 105 by modifying a color property of the color of the parent browser tab 105. The child color can be selected or generated by modifying a hue, tint, lightness, or other color property by a predefined amount.

At step 313, the browser 103 can assign the color to the child browser tab 105. From step 313, the process can proceed to step 315, where the browser 105 can generate a new browser tab 105 that is assigned the color generated at step 311 and assigned to the browser tab at step 313. From step 315, the process can proceed to completion, as the browser has created a new browser tab 105 that is related to another browser tab 105 and assigned the browser tab 105 a color that provides a contextual or cognitive cue of its relatedness to its parent browser tab 105.

Figure 4:
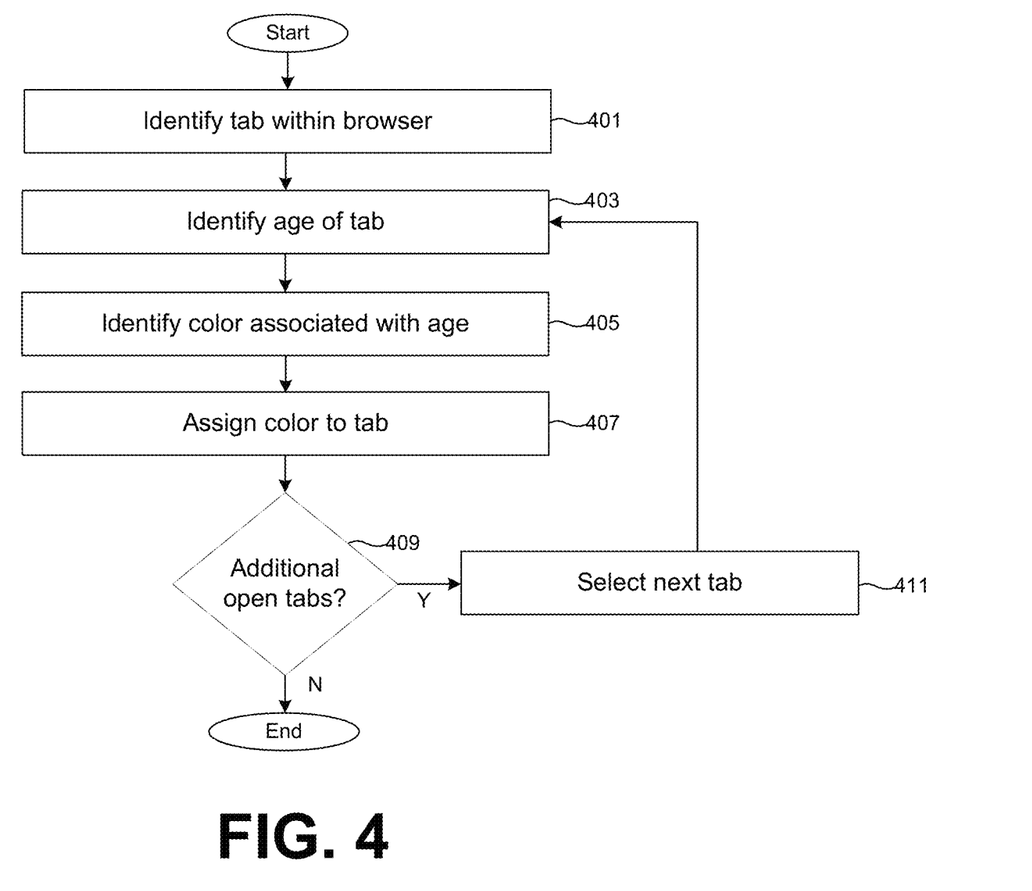
FIG. 4 is a flowchart that illustrates functionality according to a fourth example of the disclosure.

Referring next to FIG. 4, shown is a flowchart and illustrates functionality of the browser 103 according to an example of the disclosure. The functionality illustrated in FIG. 4 can also be provided by an extension, such as the tab sorting extension 221, according to certain implementations or examples. In other examples, the functionality illustrated in FIG. 4 can also be provided natively within the browser 103. Although the flowchart is discussed with respect to being performed within the browser 103, the functionality can also be implemented within the tab sorting extension 221. FIG. 4 illustrates a process whereby the browser 103 can assign a color to browser tabs 105 based upon the age of the browser tab 105. In other words, the newest browser tabs 105 can be assigned a particular color or range of color on a color gradient, and older browser tabs 105 can be assigned another color or color range. The color can be assigned without respect to relationship of browser tabs 105 to one another. The process shown in FIG. 4 can be a continuous or background process that adjusts the color of browser tabs 105 as the browser tabs 105 age.

At step 401, the browser 103 can identify a particular browser tab 105 within the browser 103. At step 403, the browser 103 can identify the age of the browser tab 105. The age of the browser tab 105 can be assessed based upon how old the browser tab 105 is, or an amount of time that has elapsed from creation of the browser tab 105.

At step 405, the browser 103 can identify a color associated with the age of the browser tab 105. The color associated with the age of the browser tab 105 can be assessed by identifying a timestamp associated with creation of the browser tab 105 and comparing the timestamp to a current time within the computing device 201.

At step 407, the browser 103 can assign a color to the browser tab 105 based upon its age. The color can be assigned to the browser tab 105 based upon its age. In one example, a color or color range can be associated with a particular age of browser tab 105. The browser 103 can be preconfigured to assign a particular color to a browser tab 105 once its age reaches a certain threshold age. As the browser tab 105 further ages, its color can change even more. In this way, a contextual or cognitive cue is associated with browser tabs in that similarly aged browser tabs are assigned a similar color within the browser 103.

As step 409, the browser tab 105 can determine whether there are additional browser tabs 105 within the browser 103 that have not been assigned a color or that require an updated assessment of color based upon the age progression of the browser tab 105. At step 411, the browser 103 can select the additional browser tab 105 and return to step 403, where the process can be repeated on the additional browser tab 105. Otherwise, the process can proceed from step 409 to completion.

The flowcharts of FIGS. 3-4 show an example of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 3-4 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The computing device 201, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The browser 103 and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

We claim the following:

1. A system for providing contextual cues between browser tabs within a browser comprising:
    a computing device comprising a processor and a memory, the computing device executing the browser, wherein the browser is configured to at least:
        receive a request to generate a new browser tab;
        determine that the new browser tab has a parent browser tab based upon the request by detecting that the request is associated with a user following a hyperlink contained within the parent browser tab;
        in response to determining that the new browser tab has a parent browser tab, identify a color assigned to the parent browser tab;
        generate a child color based upon the parent browser tab by modifying a lightness of the color assigned to the parent browser tab;
        assign the child color to the new browser tab;
        generate the new browser tab within the browser;
        receive a request to generate a second new browser tab;
        determine that the second new browser tab is unrelated to the parent browser tab by detecting that the request is unassociated with the user following a hyperlink contained within the parent browser tab;
        in response to determining that the second new browser tab is unrelated to the parent browser tab, select a new color to assign to the second new browser tab, the new color comprising a different primary color from the color assigned to the parent browser tab;
        assign the new color to the second new browser tab; and
        generate the second new browser tab within the browser.

2. The system of claim 1, wherein the browser modifies at least one of a hue or tint associated with the parent color.

3. The system of claim 1, wherein the browser modifies the color assigned to the parent browser tab to generate the child color by increasing a lightness property of the color.

4. The system of claim 1, wherein the new color is generated by selecting a different secondary color or a different tertiary color relative to the color assigned to the parent browser tab.

5. A method for providing contextual cues between browser tabs within a browser application comprising:
    receiving a request to generate a new browser tab within the browser application;
    determining whether the new browser tab has a parent browser tab based upon the request by detecting that the request is associated with a user following a hyperlink contained within the parent browser tab;
    in response to determining that the new browser tab has a parent browser tab, identifying a color assigned to the parent browser tab;
    generating a child color based upon the parent browser tab by modifying a lightness of the color assigned to the parent browser tab;
    assigning the child color to the new browser tab;
    generating the new browser tab within the browser;
    receiving a request to generate a second new browser tab;
    determining that the second new browser tab is unrelated to the parent browser tab by detecting that the request is unassociated with the user following a hyperlink contained within the parent browser tab;
    in response to determining that the second new browser tab is unrelated to the parent browser tab, selecting a new color to assign to the second new browser tab, the new color comprising a different primary color from the color assigned to the parent browser tab;
    assigning the new color to the second new browser tab; and
    generating the second new browser tab within the browser.

6. The method of claim 5, wherein generating the child color comprises modifying at least one of a hue or tint associated with the parent color.

7. The method of claim 5, wherein generating the child color comprises increasing a lightness property of the color.

8. The method of claim 5, wherein the new color is generated by selecting a different secondary color or a different tertiary color relative to the color assigned to the parent browser tab.

9. A non-transitory computer-readable medium comprising machine-readable instructions providing contextual cues between browser tabs within a browser application, wherein when executed by a processor of a computing device, the machine-readable instructions cause the computing device to at least:
    receive a request to generate a new browser tab;

determine that the new browser tab has a parent browser tab based upon the request by detecting that the request is associated with a user following a hyperlink contained within the parent browser tab;

in response to determining that the new browser tab has a parent browser tab, identify a color assigned to the parent browser tab;

generate a child color based upon the parent browser tab by modifying a lightness of the color assigned to the parent browser tab;

assign the child color to the new browser tab;

generate the new browser tab within the browser;

receive a request to generate a second new browser tab;

determine that the second new browser tab is unrelated to the parent browser tab by detecting that the request is unassociated with the user following a hyperlink contained within the parent browser tab;

in response to determining that the second new browser tab is unrelated to the parent browser tab, select a new color to assign to the second new browser tab, the new color comprising a different primary color from the color assigned to the parent browser tab;

assign the new color to the second new browser tab; and generate the second new browser tab within the browser.

10. The non-transitory computer-readable medium of claim 9, wherein the child color is generated by modifying at least one of a hue or tint associated with the parent color.

11. The non-transitory computer-readable medium of claim 9, wherein the child color is generated by increasing a lightness property of the color assigned to the parent browser tab.

12. The non-transitory computer-readable medium of claim 9, wherein the new color is generated by selecting a different secondary color or a different tertiary color relative to the color assigned to the parent browser tab.

\* \* \* \* \*